United States Patent
Wu

(10) Patent No.: US 9,217,792 B2
(45) Date of Patent: Dec. 22, 2015

(54) SYSTEM AND METHOD FOR GNSS IN-BAND AUTHENTICATED POSITION DETERMINATION

(75) Inventor: Ryan Haoyun Wu, Manlius, NY (US)

(73) Assignee: Saab-Sensis Corporation, East Syracuse, NY (US)

( * ) Notice: Subject to any disclaimer, the term of this patent is extended or adjusted under 35 U.S.C. 154(b) by 983 days.

(21) Appl. No.: 13/383,515

(22) PCT Filed: Aug. 13, 2010

(86) PCT No.: PCT/US2010/045410
§ 371 (c)(1),
(2), (4) Date: Feb. 17, 2012

(87) PCT Pub. No.: WO2011/019978
PCT Pub. Date: Feb. 17, 2011

(65) Prior Publication Data
US 2012/0133552 A1 May 31, 2012

Related U.S. Application Data

(60) Provisional application No. 61/233,872, filed on Aug. 14, 2009.

(51) Int. Cl.
| | | |
|---|---|---|
| *G01S 19/21* | (2010.01) | |
| *G01S 19/10* | (2010.01) | |
| *G01S 19/18* | (2010.01) | |
| *G01S 19/20* | (2010.01) | |

(52) U.S. Cl.
CPC ............... *G01S 19/215* (2013.01); *G01S 19/10* (2013.01); *G01S 19/18* (2013.01); *G01S 19/20* (2013.01); *G01S 19/21* (2013.01)

(58) Field of Classification Search
IPC .. G01S 19/215,19/18, 19/10; G06F 2221/2111; H04L 63/0492
See application file for complete search history.

(56) References Cited

U.S. PATENT DOCUMENTS

| 3,049,705 | A | 8/1962 | Owen et al. |
| 5,757,916 | A * | 5/1998 | MacDoran et al. ........... 380/258 |
| 5,786,773 | A | 7/1998 | Murphy |
| 5,872,540 | A | 2/1999 | Casabona et al. |
| 6,695,259 | B1 | 2/2004 | Maeda et al. |
| 7,158,053 | B2 | 1/2007 | Crank |
| 7,570,214 | B2 | 8/2009 | Smith et al. |
| 2004/0001469 | A1 | 1/2004 | Ishidoshiro |
| 2008/0170536 | A1 | 7/2008 | Marshack et al. |
| 2008/0189420 | A1 | 8/2008 | Herrod et al. |

FOREIGN PATENT DOCUMENTS

WO 02/50743 A1 6/2002

\* cited by examiner

*Primary Examiner* — Tashiana Adams
*Assistant Examiner* — Fred H Mull
(74) *Attorney, Agent, or Firm* — Burr & Brown, PLLC

(57) ABSTRACT

The present invention provides a system and method for determining the authenticity of reported positions of GNSS receivers, such as aircraft equipped with GPS positioning devices, and provides an in-band verification capability for GNSS positions by tasking one or more GNSS satellites as designated authentication support (DAS) satellites that transmit corrupted ephemeris data in a pseudo-random error corrupted C/A signal on the L1 band, and the GNSS receivers determine authentication ranges to the DAS satellites and transmit the DAS authentication ranges as part of their position report. The surveillance system can verify the authenticity by comparing the transmitted authentication ranges to true authentication ranges determined using actual ephemeris data and the known C/A code pseudo-random error for the DAS satellites.

40 Claims, 2 Drawing Sheets

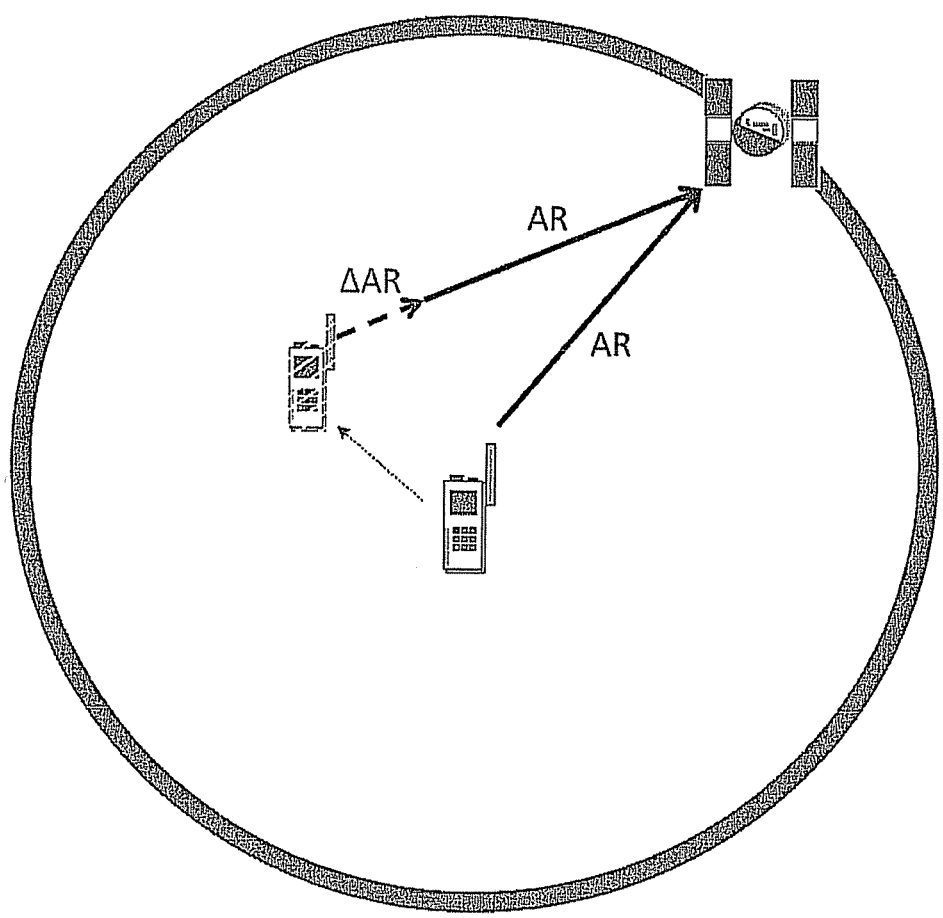

SYSTEM AND METHOD FOR GNSS IN-BAND AUTHENTICATED POSITION DETERMINATION

FIELD OF THE INVENTION

The present invention provides a system and method for determining the authenticity of reported positions of GNSS receivers, such as aircrafts equipped with GPS positioning devices, and provides an in-band verification capability for GNSS positions that overcomes the potentially devastating effects of intentional tampering with the reported position information.

BACKGROUND OF THE INVENTION

As society incorporates more and more highly collaborative systems into its infrastructure, the integrities of such collaborative systems need to be maintained at constant highs. With the proliferation of global navigation satellite systems (GNSS), the world has benefited from the widely accessible precision timing and positioning services brought by GNSS that drives a good portion of the world's communication, financial, power grid, air transportation, security, and defense infrastructures. The ever greater reliance and trust placed upon the GNSS infrastructure leads to growing concerns with regard to unintentional and intentional abuses of the system. For example the future air transportation system such as FAA's NextGen Air Transportation System and European's Single European Sky ATM Research (SESAR) rely on aircrafts cooperatively reporting their GNSS positions in the clear without any encryption through a system known as Automatic Dependent Surveillance-Broadcast (ADS-B), such that unintentional incorrect position reporting (system error) or intentional spoofing (fake position reports) may damage the integrity of the system, causing significant degradation in operational safety and eventually paralyzing the air traffic management system.

Further, for encrypted GNSS position information (such as Mode 5, military equivalent of ADS-B), there is a growing concern regarding the soundness of the protection provided by the cryptology as the speed of attacks increases rapidly each year. An undetected tainted or spoofed position report creates incorrect position information which may not only lower the chance of success of an operation but also may endanger the welfare of participating units.

A couple of examples of where GNSS transceivers are often used for collecting valuable time and position-sensitive information that influences decision making process and/or assists ongoing operations are police and military operations. Another example is any information, record, or database that is crucial to security, such as on-line transaction records, may need stronger protections from malicious alterations as a result of external and internal security breaches.

Currently, to verify a reported GNSS position, an independent surveillance system is required that can provide position observations on the reporting party. For example, in order to verify an aircraft position in the ADS-B system, conventional radar surveillance systems or wide-area multilateration (WAM) surveillance systems are currently utilized. For GPS-enabled mobile devices, the existing cellular, WLAN, WiMax or other multilateration capabilities in the wireless communications infrastructure are used for providing independent position estimates to verify the positions reported by GPS-enabled mobile devices. These surveillance systems are outside of GNSS signaling framework (i.e., out-of-band) and suffer from disadvantages of incomparable coverage and accuracy to GNSS-based systems. In addition, these out-of-band surveillance systems require large infrastructure investments and present significant challenges for integrating and managing multiple systems with different accuracies.

What is needed is a system and method that can verify that accurate positions are being reported by GNSS equipped platforms and can perform the position verification within the GNSS signaling framework and infrastructure (i.e. in-band) in a highly integrated and precise fashion to provide seamless coverage without the need for independent surveillance systems.

SUMMARY OF THE INVENTION

The present invention discloses a system and method for in-band GNSS-based position authentication of GNSS-based position reports. The present invention amends the existing GNSS receiver functionality to add an additional feature for generating an "authentication range" measurement from a specially tasked GNSS satellite. The new authentication range measurement is transmitted with the conventional GNSS position report to provide position authentication.

According to a first aspect of the present invention, there is provided a GNSS In-Band Authentication system comprising a GNSS ground segment, a GNSS user segment comprising at least one GNSS receiver, and a GNSS space segment comprising a GNSS satellite constellation transmitting ephemeris data in a C/A message on the L1 band, wherein one or more GNSS satellites are designated authentication support (DAS) satellites and transmit a special status signal and intentionally corrupted ephemeris data and an intentionally corrupted C/A signal including a pseudo-random error on the L1 band. The at least one GNSS receiver calculates its own position using GNSS satellites in the GNSS satellite constellation other than the one or more DAS satellites, determines authentication ranges to the one or more DAS satellites within a field of view of a GNSS receiver, determines the GNSS time of the position and transmits a position report comprising at least its calculated own position, position time, and the determined authentication range for the one or more DAS satellites within a field of view of the GNSS receiver to a surveillance system. The surveillance system receives the position report, computes verification ranges to the one or more DAS satellites using the reported position of the at least one GNSS receiver, uncorrupted ephemeris data for each of the one or more DAS satellites, and position time, compares the computed verification ranges to the determined authentication ranges in the received position report, and verifies the reported position of the at least one GNSS receiver when the computed verification ranges and the determined authentication ranges in the received position report are within a predetermined tolerance range.

In some embodiments of the present invention, the surveillance system accesses uncorrupted ephemeris data and uncorrupted C/A data for the one or more DAS satellites to compute verification ranges. In other embodiments, the pseudo-random error in the C/A code uses the GPS selective availability scheme. In some embodiments, the ephemeris data transmitted by GNSS is used by the at least one receiver to determine a pseudo range according to the following equation:

$$R_{p1} = R_1 + R_b$$

where:
$R_{p1}$ is the measured pseudo range to satellite $P_1$;
$R_1$ is the actual range to satellite $P_1$; and
$R_b$ is the satellite pseudo range bias.

In some embodiments, the surveillance system receiving the position report transmits the position report to a third party authenticator and requests the third party authenticator to verify the position report of the at least one GNSS receiver. In some of these embodiments, the surveillance system accesses uncorrupted ephemeris data and uncorrupted C/A code data for the one or more DAS satellites to compute verification ranges. In other embodiments, the authentication range calculated by the at least one GNSS receiver for the one or more DAS satellites using the following equation:

$$AR\ pseudo\ range = AR + R_b, \text{ or}$$

$$AR = AR\ pseudo\ range - R_b$$

where:
AR is the estimated range (authentication range) to DAS satellite;
$R_b$ is the satellite pseudo range bias; and
AR pseudo range is the measured pseudo range to the DAS satellite.

In some embodiments, the one or more DAS satellites transmit correct ephemeris data on the P(Y) code signal on the L2 band. In other embodiments, the position report includes authentication ranges to two DAS satellites. In some embodiments the position report is an ADS-B report. In these embodiments, the authentication ranges to the one or more DAS satellites verify the validity of the reported position of the at least one GNSS receiver.

In some embodiments, the DAS authentication ranges are used as a secure position selective communication (PSC) layer. In other embodiments, the PSC layer provides a secure communications channel that is only available at predetermined locations, wherein each user attempting to link to the secure communications channel reports its own position, and wherein the reported position is compared to the predetermined locations before the user is granted access to the secure communications channel. In some of these embodiments, the PSC layer is used with other cryptographic layers to secure communications channels.

In some embodiments, the authentication range is used as a public key to decrypt data encrypted by a private key generated from the verification range to one or more DAS satellites for information push applications. In other embodiments, data is encrypted using a DAS satellite position and a known position of a designated receiving unit and transmitted to the designated receiving unit, and only the designated receiving unit at the known position can decrypt the received data.

In some embodiments, a credit card user designates one or more locations as valid for on-line credit card transactions, and the DAS authentication ranges are used as a physical location verification layer for an additional security layer for authorizing on-line transactions from only the one or more locations. In other embodiments, a user designates one or more locations as valid personal locations, and the DAS authentication ranges are used as a physical location verification layer as an additional security layer for an enhanced electronic signature verification to the one or more locations.

In some embodiments, a user designates one or more locations as valid WLAN access locations, and the DAS authentication ranges are used as a physical location verification layer to restrict access to the WLAN to the one or more locations. In other embodiments, a user designates one or more locations as valid WAN/WiMax access locations, and the DAS authentication ranges are used as a physical location verification layer to restrict access to the WAN/WiMax to the one or more locations.

In some embodiments, a user designates one or more locations as valid to receive satellite broadcasting, and the DAS authentication ranges are used as a physical location verification layer to restrict receiving satellite broadcasting to the one or more locations. In other embodiments, the surveillance system transmits the received position report from the GNSS receiver to a third party authenticator and the third party authenticator computes verification ranges to the one or more DAS satellites from the reported position of the GNSS receiver, and compares the computed verification ranges to the reported authentication ranges and transmits a verification to the surveillance system when the computed verification ranges and the verification ranges in the received position report are within a predetermined tolerance. In some embodiments, at least the reported GNSS position, the position time and authentication range are stored in an archive and alterations to the position records are detected by comparing the altered position derived range to the DAS satellite to the stored authentication range at the position time.

According to a second aspect of the present invention, there is provided a method of providing GNSS In-Band Authentication, the method comprising transmitting ephemeris data in a C/A message on the L1 band from GNSS satellites in a GNSS satellite constellation, wherein one or more GNSS satellites are designated authentication support (DAS) satellites and transmit a special status signal and intentionally corrupted ephemeris data and an intentionally corrupted C/A signal including a pseudo-random error on the L1 band, receiving ephemeris data on the at least one GNSS receiver in a GNSS user segment, wherein the at least one GNSS receiver calculates its own position using GNSS satellites in the GNSS satellite constellation other than the one or more DAS satellites, determines authentication ranges to the one or more DAS satellites within a field of view of a GNSS receiver and position time, and transmits a position report comprising at least its calculated own position, position time, and the determined authentication range and DAS satellite identification information for the one or more DAS satellites within a field of view of the GNSS receiver to a surveillance system. The surveillance system receives the position report transmitted by the at least one GNSS receiver, computes verification ranges to the one or more DAS satellites using the reported position of the at least one GNSS receiver uncorrupted ephemeris data for each of the one or more DAS satellites, and position time, compares the computed verification ranges to the verification ranges in the received position report, and verifies the reported position of the at least one GNSS receiver when the computed verification ranges and the verification ranges in the received position report are within a predetermined tolerance range.

In some embodiments of the present invention, the surveillance system accesses the uncorrupted ephemeris data and uncorrupted C/A code without the pseudo-random error for the one or more DAS satellites to compute verification ranges. In other embodiments, the position report includes authentication ranges to two DAS satellites.

In some embodiments, the surveillance system receives the position report, transmits the position report to a third party authenticator, and requests the third party authenticator to verify the position report of the at least one GNSS receiver. In some of these embodiments, the third party authenticator accesses actual ephemeris and APN information for the one or more DAS satellites to compute verification ranges.

In some embodiments, the DAS authentication ranges to the one or more DAS satellites are used as a secure position selective communication (PSC) layer. In other embodiments, the method further comprises providing a secure communications channel that is only available at predetermined locations, each user attempting to link to the secure communications channel reports their position, and the reported position is compared to the predetermined locations by the PSC layer before the user is granted access to the secure communications channel. In some of these embodiments, the PSC layer is used with other cryptographic layers to secure communications channels.

In some embodiments, the method further comprises using the authentication range to one DAS satellite as a public key to decrypt data encrypted by a private key generated using a secret range to the DAS satellite known to the surveillance system for information push applications. In other embodiments, data is encrypted using one DAS satellite position and a known position of a designated receiving unit and transmitted to the designated receiving unit, and only the designated receiving unit at the known position can decrypt the received data.

In some embodiments, a credit card user designates one or more locations as valid for on-line credit card transactions, and the DAS authentication ranges are used as a physical location verification layer for an additional security layer for authorizing on-line transactions from only the one or more locations. In other embodiments, a user designates one or more locations as valid personal locations, and the DAS authentication ranges are used as a physical location verification layer as an additional security layer for an enhanced electronic signature verification to the one or more locations.

In some embodiments, a user designates one or more locations as valid WLAN access locations, and the DAS authentication ranges are used as a physical location verification layer to restrict access to the WLAN to the one or more locations. In other embodiments, a user designates one or more locations as valid WAN/WiMax access locations, and the DAS authentication ranges are used as a physical location verification layer to restrict access to the WAN/WiMax to the one or more locations.

In some embodiments, a user designates one or more locations as valid to receive satellite broadcasting, and the DAS authentication ranges are used as a physical location verification layer to restrict receiving satellite broadcasting to the one or more locations. In other embodiments, the surveillance system transmits the received position report from the GNSS receiver to a third party authenticator and the third party authenticator computes verification ranges to the one or more DAS satellites from the reported position of the GNSS receiver, and compares the computed verification ranges to the reported authentication ranges and transmits a verification to the surveillance system when the computed verification ranges and the verification ranges in the received position report are within a predetermined tolerance.

In some embodiments, at least the reported GNSS position, the position time and authentication range are stored in an archive and alterations to the position records are detected by comparing the altered position derived range to the DAS satellite to the stored authentication range at the position time.

BRIEF DESCRIPTION OF THE DRAWINGS

For a fuller understanding of the nature and objects of the invention, reference should be made to the following detailed description of a preferred mode of practicing the invention, read in connection with the accompanying drawings in which:

FIG. 2 illustrates a GNSS receiver determining an authentication range (AR) to a DAS satellite in one embodiment of the present invention.

DETAILED DESCRIPTION OF THE INVENTION

Figure 1:
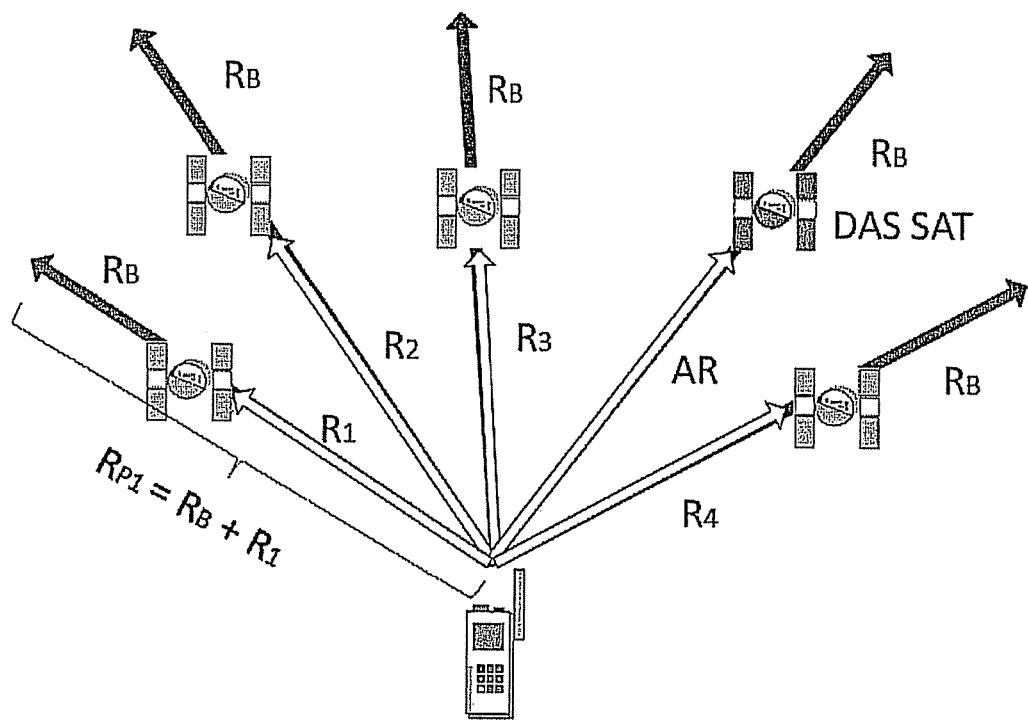
FIG. 1 illustrates a GNSS receiver receiving multiple GNSS satellite signals including a DAS satellite in one embodiment of the present invention.

The GNSS In-band Authentication (GIA) system and method of the present invention uses the existing space, ground, and user segments of the GNSS system. To provide an in-band position authentication capability within the existing GNSS satellite system, at least one GNSS satellite is configured as a "designated authentication support" (DAS) satellite (SAT) for facilitating the authentication data generating service.

The DAS satellite is configured to broadcast a special code indicating that the satellite is a DAS satellite that should not be used for position determination by GNSS receivers and should only be used for generating position authentication information. The DAS satellite transmits corrupted ephemeris or orbit data on the commercially available L1 band C/A signal so that a GNSS receiver using the L1 C/A signal would not use the DAS satellite L1-C/A signal for determining its position and would not know the exact ephemeris or orbit data of the DAS satellite at any given time. Access to the precise ephemeris data of the DAS SAT is restricted.

In one embodiment of the present invention, the DAS SAT transmits a C/A signal with intentionally injected corrupting pseudo-random error called Authenticity Protection Noise (APN). In one embodiment the APN is generated using the existing Selective Availability (SA) scheme of GPS. The APN intentionally corrupts all parts of the C/A signal including the modulated navigation signals, thereby preventing a GNSS receiver from precisely measuring the pseudo range to the DAS SAT. Using the other GNSS satellites in view, the GNSS receiver estimates its position and pseudo range bias as is currently done in normal GNSS operations. Referring to FIG. 1, $R_B$ is the pseudo range bias. $R_i$ is the range to the satellite-i. The GNSS signal enables the GNSS receiver to measure pseudo ranges to GNSS satellites in view, which are $R_{Pi}=(R_i+R_B)$ for all satellites i. Given the pseudo ranges $R_{Pi}$ and the precise position of the other GNSS satellites derived from the navigation messages including the ephemeris data, the location of the GNSS receiver, clock offsets and the pseudo range bias are determined. The GNSS receiver then estimates the authentication range (AR) using the observable pseudo range to the DAS SAT and the estimated pseudo range bias. The GNSS receiver position estimate, the time of the position estimate and the authentication range are transmitted to the surveillance system. The estimated authentication range to the DAS satellite, or AR, is then used to verify the authenticity of the position reported by the GNSS receiver.

For example, assuming at the time the GNSS receiver estimates its position, there are N satellites in view and one of the satellites is a DAS SAT whose transmitted ephemeris data is known to be unusable, in one embodiment the GNSS receiver performs the following processing:

The GNSS receiver estimates pseudo ranges to each of the N satellites. The pseudo range is the actual range from the GNSS receiver to one of the N GNSS satellites plus a pseudo range bias which is the clock offset between the GNSS satellite and GNSS receiver times signal propagation speed. The pseudo range bias is identical in all observed pseudo range measurements.

The GNSS receiver estimates its own position and the pseudo range bias using the C/A signals of the N−1 GNSS satellites that are not the DAS SAT. The GNSS or UTC time of the position report is also determined from the GNSS satellite time information and the pseudo range bias measurement.

The GNSS receiver estimates the Authentication Range (AR) using the pseudo range to the DAS SAT and the pseudo range bias using the following equation:

AR pseudo range=AR+$R_b$, or

AR=AR pseudo range−$R_b$ where:
AR pseudo rangy is the measured pseudo range to the DAS satellite using the APN corrupted C/A signal;
$R_b$ is the estimated pseudo range bias; and
AR is the computed authentication range to the DAS satellite.

The GNSS receiver then transmits a position report including at least the estimated GNSS receiver position, the time of position estimate, and computed authentication range (AR). The transmitted AR contains information of the identity of the DAS SAT.

In one embodiment, the surveillance system verifies the reported position of a GNSS receiver by transmitting the reported position and authentication range to a third-party authenticator that computes the true authentication range using the precise DAS SAT ephemeris and APN information and compares the received authentication range with the computed authentication range. When the received authentication range and computed authentication range are within a specified tolerance, the third-party authenticator verifies and authenticates the reported position of the GNSS receiver and transmits the results to the surveillance system.

For example, in this embodiment the third-party authenticator performs the following steps to verify the received position report from a GNSS receiver:

The third-party authenticator receives the position report including the authentication range of the GNSS receiver from the authentication requesting surveillance system. The third-party authenticator has access to the restricted DAS SAT ephemeris and APN information.

The third-party authenticator calculates the precise position of the DAS SAT at the received time the position estimate of the GNSS receiver from the received position report and the ephemeris information of the DAS SAT.

The third-party authenticator calculates the precise distance between the GNSS receiver and DAS SAT (the "true authentication or verification range" or $AR_T$) based on the received GNSS receiver estimated position and the calculated DAT SAT position.

Based on the authentication range from the received GNSS receiver position report and the injected APN, the third-party authenticator calculates the "de-corrupted authentication range" or $AR_D$. Given the knowledge of the C/A code and the APN at the time of position estimate, the effect of APN on the DAS-SAT pseudo range estimation can be estimated such that bias or error can be removed from AR. Note that the intensity of APN is adjustable and in one embodiment zero-intensity APN is applied thus $AR_D$ is AR.

The third-party authenticator then calculates the absolute difference between $AR_D$ and $AR_T$ (i.e. $\Delta AR=|AR_D-AR_T|$).

The third-party authenticator compares the determined absolute difference with a predetermined tolerance value, $TOL_{\Delta AR}$, if the difference exceeds the tolerance (i.e. $\Delta AR > TOL_{\Delta AR}$) the position is determined to be not valid and NOT AUTHENTIC; if the difference is no greater than the tolerance (i.e. $\Delta AR \leq TOL_{\Delta AR}$), the position is determined to be valid and AUTHENTIC.

The third-party authenticator transmits a message to the surveillance system indicating whether the position report of the GNSS receiver is authenticated or not.

In another embodiment, the surveillance system verifies the reported position of a GNSS receiver by computing the expected authentication range using the precise DAS SAT ephemeris and APN information and comparing the received authentication range with the computed authentication range, in a manner similar to the method described above. When the difference between the received authentication range and computed authentication range are within a specified tolerance, the reported position of the GNSS receiver is verified and authenticated. The method of the present invention can be thought as a dynamic public-key/private-key scheme where the combination of the ephemeris and APN is the private key and the ever-changing $AR_C$ is the public key.

The GNSS satellite controlling authority, such as the FAA or military, can change the DAS satellite function to different satellites with the GNSS satellite constellation. The DAS satellite transmission of an intentionally corrupted C/A signal on the commercially available L1 band, does not impact or change the correct ephemeris data transmitted on the P(Y) code signals (i.e., L2 band) for military operations.

The authentication system and method of the present invention requires at least one DAS satellite to be visible in the GNSS satellite constellation, as shown in FIG. 1. To achieve higher levels of protection, a GNSS receiver computes authentication ranges to two or more DAS satellites in each transmitted position report.

In existing GNSS-based surveillance systems, a third party can intentionally transmit an incorrect position report and no mechanism within the GNSS infrastructure will detect the intentional incorrect position report.

If a third party attempts to intentionally transmit an incorrect position report to the surveillance system in the present invention, the authentication range of the present invention makes this extremely difficult, if not impossible, because the authentication range will need to be altered precisely to match the incorrect position without knowledge of the precise location of the DAS satellite. For example, assume a third party wants to tamper with the position report by moving the aircraft from its estimated position by a distance of 1000 meters (e.g., offset position). The third party will also need to modify the value of AR according to the new distance between the offset position and the DAS SAT position. Because the precise position of the DAS SAT is unknown to the third party, the third party cannot modify the AR of the estimated position to be valid for the offset position. For sophisticated third parties, who attempt to track the positions of DAS satellites, the third party will be unable to track all of the GNSS satellites, including the DAS satellites without having resources similar to the GNSS ground control segment. Further, the quality of the tracked positions by the third party is likely to be inferior to that of the precise ephemeris data such that the altered AR of the offset position can still be detected. Alternatively, a third party may track all GNSS satellites and use the ephemeris data for a particular satellite when it broadcast its change in status to a DAS satellite. Since the ephemeris data that is broadcast is valid for a couple of hours, within this time window the third party could infer the position of the DAS satellite. In the present invention, to mitigate this potential concern, a DAS satellite will change its orbit to a degree the previous ephemeris data is no longer valid for the purpose of validation when the satellite is tasked as a DAS satellite.

Referring to FIG. 2, AR is the Authentication Range. When a GNSS receiver intentionally transmits an incorrect position to mislead the surveillance system, the correct value of the alteration value on AR, ΔAR, cannot be determined by the GNSS receiver since the exact position of the DAS SAT is unknown to the GNSS receiver. For authentic position reports, the reported AR will be consistent with the distance between the reported receiver position and the known DAS SAT position. An incorrect reported position is detected when the reported authentication range value is sufficiently different from the range derived from the precise DAS satellite position and the reported GNSS receiver position. Only a party having access to the exact position of the DAS SAT at the time of position estimate can correctly estimate the authentication range for an incorrect position. Similarly, a party having access to the exact position of the DAS SAT at the time of position estimate can determine whether the reported position is correct and authentic.

While the present invention will reduce the number of GNSS satellites transmitting valid C/A messages on the commercially available L1 band by at least one satellite in a coverage region to provide the new authentication range measurement capability, the effect of the reduction in the number of GPS satellites in particular is mitigated as the GALILEO constellation enters service based on the interoperability agreement between the GPS and GALILEO systems.

For GALILEO or other GNSS satellite constellations, such as GLONASS and COMPASS, the authenticator, whether a surveillance system or a third-party authenticator, needs access to the data for the DAS satellite. For example, where a DAS satellite is part of the GPS constellation, any authenticator will need to be granted access to the DAS satellite data by the USAF GPS Wing or through a military issued and controlled device that can decode the navigation message of the DAS satellite. For military users, however, the effective number of usable in-view GNSS satellites is not affected and navigation messages, which include ephemeris data, are broadcast on the P(Y) code signal.

The present invention provides greater security for the ADS-B based NextGen and SESAR. Position report integrity of an ADS-B system remains one of the most vulnerable parts of the system facing potential terrorist attacks. Since current verification methods rely on conventional radars and wide area multilateration systems to achieve full coverage, the present invention provides an in-band solution that provides a more secure and lower cost system alternative.

The present invention is not limited to the authentication of aircraft position reports as discussed above. The following paragraphs describe several different applications in which the present invention provides enhanced security but the present invention is not limited to the applications disclosed herein. In one embodiment, the authentication system and method of the present invention are used as a secure position selective communication (PSC) protocol. The secure position selective communication (PSC) protocol is an additional security layer that can be used by itself of as an additional security layer on top of current cryptography-based communication schemes.

For example, a secured communication link is to be established between two locations, such as business offices at point A and point B. If the secured communication link uses conventional encryption layer, when the conventional encryption layer is broken by a third party, the communications over the secured communication link are exposed to the third party. However, this embodiment requires the offices at point A and point B to authenticate their locations using PSC protocol before the secured communication link is established and during the operation of the secured communication link. The PSC protocol layer further encrypts the communications link using authentication ranges determined by GPS receivers at point A and point B. By adding the additional PSC layer of this embodiment of the present invention on top of the conventional encryption layer, the third party needs to break the conventional encryption layer and also needs to either be physically present at either point A or point B, or correctly determine the authentication ranges from either point A or point B to one or more DAS satellites to properly decode the two-way communications. This mitigates many types of potential attacks including a middle man attack because the middle man needs to be co-located with one of the communicating parties at points A or B or correctly determine the authentication range from either point A or point B to carry out a middleman attack. Such added security can also be applied for more secure communications for both civilian and military communication links.

In another embodiment, for single-direction data broadcasting or information push applications, the constantly changing Authentication Range may be used as a public key to decrypt data encrypted by private keys generated from actual DAS satellite data. For example, assuming a sensor is relaying surveillance data back to a police or military control center from a persistent surveillance unit or an unmanned aerial vehicle (UAV), and each data packet is time and position stamped using the onboard GNSS receiver and is further encrypted for security. Assuming a third party intercepts the data packets, if the third party breaks the encryption, the third party can decrypt the data packet and the security of the data is breached. Now if the data packet is further encrypted using a public key generated from the Authentication Range measurement provided by the GNSS receiver in accordance with this embodiment of the present invention, without knowing the exact position of the DAS SAT, the data packet will still be safe from compromise by the third party even if the original encryption is broken. This position-selective protection of the present invention from constantly changing authentication ranges is more robust than a "daily-key" based or an "hourly-key" based scheme.

In another example, assume that data is being pushed from a control center to a front-end node, such as an operating unit in situ, to ensure that only the intended front-end node receives the pushed data, the data packet is encrypted with a private key using the DAS SAT position and the position of the front-end node as the basis for generating the decryption key. Upon receiving the data packet, the front-end node decrypts the data packet using a key generated from their authentication range determined by a GNSS receiver. A third party that also receives the data packet will not be able to decrypt the data packet unless it is also located at the position of front-end node or correctly determine the authentication range from the position of front-end node. The effectiveness of the protection of the PSC depends on the intended party to be at the proper location at the right time. The PSC capability does not requires the front-end unit to be equipped with a P(Y)-code-enabled GPS receiver device and will not cause additional security breaching concerns, thereby enabling PSC enabled devices to be managed with lower security requirements.

The PSC of the present invention also provides new advantages for conducting multi-nation joint operations by enabling the participants in the joint operations to restrict communications to a subset of participants using a PSC. For example, communications are carried out using a common encryption key but restricted communications also include an additional position selective key (PSC), thereby restricting those communications to only the intended parties.

Other embodiments of the present invention provide a means for providing authentication of locations for both real-time and recorded data. The need for information integrity is ever increasing in this ever degrading world. Currently, tampering or alteration of GNSS position reports or report histories is likely to be undetectable without an independent position reporting source of information to provide verification. As the technology has advanced from merely protecting secrecy and integrity of data (encryption, watermarking), to proving identifications of communication parties (authentication and digital signature), and to proving the integrity of the time of the data or event (time stamp, as described in ANSI X9.95 for example), the present invention enables a party to prove the integrity of the location of data or event (position stamp) by authentication of the data.

The present invention provides means of certifying or confirming the genuineness of GNSS position information for at least the following examples:

Improving online transaction security by using verifiable GNSS positions. For example, a credit card user provides specific locations that the user authenticates as valid for online shopping to prevent credit card fraud (e.g., home, office). In this example, a new PSC layer of security is added on top of the existing SSL or TLS protocol to provide verification of the physical location of the credit card user. In this example, the merchant or credit card company rejects any on-line purchases where the credit card user fails to report a location or is at a location that is not registered for on-line purchases on the credit card. In another example, the credit cared user provides specific locations that the user authenticates as valid for online shopping and on-line merchants that are valid for transactions. In this example, the credit card company rejects any on-line purchases where the credit card user fails to report a location, is at a location that is not registered for on-line purchases on the credit card or the purchase is made at a merchant not registered for on-line purchases. The above examples can also be implemented to include purchases and merchants that are not on-line.

To prevent tampering of evidence of GNSS position records. Any alteration of the GNSS position records breaches the integrity of data such that the position information can no longer be authenticated.

An enhanced electronic signature scheme. In this example, an enhanced electronic signature includes not only a time stamp (e.g. ANSI X9.95 standard) but also a position stamp provided by a thirty-party issuer or certifier. This embodiment of the present invention can be extended to verify any abstract data from time domain to both time and space domains. Some applications:

To prove liability or non-liability of a service company that is required to deliver a service at required locations at certain times. For example, a security company can prove in court its personnel had done their duty when accused of not doing the required job when an incident occurred. In this case a certified/verifiable patrol history becomes key evidence.

A certified/verifiable location of a mobile point of sale transaction or delivering service or goods will help determine the proper jurisdiction, regulation, or policy for taxation, billing and legal purposes.

A certified/verifiable location of an incident (e.g. arresting a person, traffic or other violations, accidents/incidents involving machinery such as automobiles, boat, or aircraft, signing a contract, signing a delivery receipt) helps determine the jurisdiction of pertaining legal or law enforcing matters.

Using a verifiable GNSS position to restrict mobile wireless data access or device functions to defined areas or to deny services at restricted areas. A verifiable GNSS position is immune to software or firmware hacking. Hackers may obtain complete control over the mobile device and attempt a middle man attack however such attack will fail because the incorrect positions will not be verified and service will still be denied. For example, Residential WLAN access denial to unauthorized users (e.g., keep your neighbors off of your WLAN unless he or she is in your house or within a defined radius on your property).

Commercial "venue-specific" or "customer only" WAN/WiMax service is provided to the defined area eliminating the need for annoying portal ID/PW/login managing processes.

For region/location-restricted services (e.g. streaming video or other contents to mobile devices at only certain locations or satellite broadcasting/simulcasting to only the licensed venues), the service provider can verify a service receiver's GNSS location before granting access to receive the service.

To prevent hacking of the region lockout functionality for region/location-restricted devices or software (such as DVD players, which only play discs with particular region code(s)), requesting a real-time GNSS position verification by a third-party authenticator.

To help prevent online predators from cheating innocent victims by verifying their physical locations.

To help identify fraudulent 911 reports by verifying the location of the reporting party using the authentication range (assuming the mobile phone has GIA enabled GNSS receiver).

Of course, the potential uses of the present invention are not limited to the above mentioned examples.

In addition, the principle of the present invention can be extended to other signal transmitters in space that have the following features:

constantly transmitting signals from the high sky;
constantly changing its transmitting location;
transmission locations are known to a specific party in a tightly controlled manner and access is restricted; and
signal arrival time can be measured accurately For example, ATCRBS and non-ADS-B Mode-S transponders could be used in an embodiment of the present invention. These aircraft transponders have the aforementioned features of being transmitting signals from the sky and are constantly moving, signal arrival time can be estimated with good accuracy, and the positions are also heavily guarded by the ATC authorities and cannot be easily observed by a third party. However to utilize aircraft transponder signals in the present invention, the GNSS device needs to decode and timestamp transponder signals with respect to GNSS or UTC time. Such timestamps then replace the Authentication Range and are used for authenticating the position of the unit based on the safe-guarded positions of the ATCRBS and Mode-S transponder equipped aircraft. Note that since the ATCRBS/Mode-S receiving capability is not for safety of life applications, the requirements may be relaxed. Also since the SSR band of 1090 MHz is close to that of GNSS bands an integrated receiver may be possible such that a low cost realization may be achievable.

In summary, the GNSS In-band Authentication (GIA) system and method of the present invention provides a GNSS position authentication capability for the security of ADS-B systems without the need for costly independent surveillance systems, provides an additional layer of protection for secure communications such that the potential impacts on successful attacks on the cryptography can be mitigated.

While the present invention has been particularly shown and described with reference to the preferred mode as illustrated in the drawings, it will be understood by one skilled in the art that various changes in detail may be effected therein without departing from the spirit and scope of the invention as defined by the claims.

The invention claimed is:

1. A GNSS In-Band Authentication system comprising:
a GNSS ground segment;
a GNSS user segment comprising at least one GNSS receiver; and
a GNSS space segment comprising a GNSS satellite constellation transmitting ephemeris data in a C/A message on the L1 band, wherein one or more GNSS satellites are designated authentication support (DAS) satellites and transmit a special status signal, intentionally corrupted ephemeris data and an intentionally corrupted C/A signal including a pseudo-random error on the L1 band;
wherein the at least one GNSS receiver is configured to calculate its own position using GNSS satellites in the GNSS satellite constellation other than the one or more DAS satellites, determine authentication ranges to the one or more DAS satellites within a field of view of a GNSS receiver, determine the GNSS time of the position, and transmit a position report comprising at least its calculated own position, position time, and the determined authentication range for the one or more DAS satellites within a field of view of the GNSS receiver to a surveillance system, and
wherein the surveillance system is configured to receive the position report, compute verification ranges to the one or more DAS satellites using the reported position of the at least one GNSS receiver, uncorrupted ephemeris data for each of the one or more DAS satellites, and position time, compare the computed verification ranges to the determined authentication ranges in the received position report, and verify the reported position of the at least one GNSS receiver when the computed verification ranges and the determined authentication ranges in the received position report are within a predetermined tolerance range.

2. The GNSS In-Band Authentication system of claim 1, wherein the surveillance system is configured to access uncorrupted ephemeris data and uncorrupted C/A data for the one or more DAS satellites to compute verification ranges.

3. The GNSS In-Band Authentication system of claim 2, wherein the pseudo-random error injected into in the C/A code is generated using a GPS selective availability scheme.

4. The GNSS In-Band Authentication system of claim 1, wherein the at least one receiver is eon to use the ephemeris data transmitted by GNSS to determine a pseudo range according to the following equation:

$$R_{p1}=R_1+R_b$$

where:
$R_{p1}$ is the measured pseudo range to satellite $P_1$;
$R_1$ is the actual range to satellite $P_1$; and
$R_b$ is the satellite pseudo range bias.

5. The GNSS In-Band Authentication system of claim 1, wherein the at least one GNSS receiver is configured to calculate the authentication tune for the one or more DAS satellites using the following equation:

$$AR \text{ pseudo range}=AR+R_b, \text{ or}$$

$$AR=AR \text{ pseudo range}-R_b$$

where:
AR is the estimated range (authentication range) to DAS satellite;
$R_b$ is the satellite pseudo range bias; and
AR pseudo range is the measured pseudo range to the DAS satellite including the satellite pseudo range bias.

6. The GNSS In-Band Authentication system of claim wherein the surveillance system is configured to receive the position report transmits the position report to a third party authenticator and request the third party authenticator to verify the position report of the at least one GNSS receiver.

7. The GNSS In-Band Authentication system of claim 6, wherein the third party authenticator accesses uncorrupted ephemeris data and uncorrupted C/A code data for the one or more DAS satellites to compute verification ranges.

8. The GNSS In-Band Authentication system of claim 1, wherein the one or more DAS satellites are configured to transmit correct ephemeris data on the P(Y) code signal on the L2 band.

9. The GNSS In-Band Authentication system of claim 1, wherein the position report includes authentication ranges to two DAS satellites.

10. The GNSS In-Band Authentication system of claim 1, wherein the position report is an ADS-B report.

11. The GNSS In-Band Authentication system of claim 10, wherein the surveillance system is configured to use the authentication ranges to the one or more DAS satellites to verify the validity of the reported position of the at least one GNSS receiver.

12. The GNSS In-Band Authentication system of claim wherein the authentication system is configured to use DAS authentication ranges are used as a secure position selective communication (PSC) layer.

13. The GNSS In-Band Authentication system of claim 12, wherein the PSC layer provides a secure communications channel that is only available at predetermined locations, wherein each user attempting to link to the secure communications channel reports its own position, and wherein the reported position is compared to the predetermined locations before the user is granted access to the secure communications channel.

14. The GNSS In-Band Authentication system of claim 12, wherein the PSC layer is used with other cryptographic layers to secure communications channels.

15. The GNSS In-Band Authentication system of claim 1, wherein for information push applications, the authentication system is configured to use the authentication range as a public key to decrypt data encrypted by a private key generated from the verification range to one or more DAS satellites.

16. The GNSS In-Band Authentication system of claim 15, wherein data is encrypted using a DAS satellite position and a known position of a designated receiving unit and transmitted to the designated receiving unit, and only the designated receiving unit at the known position can decrypt the received data.

17. The GNSS In-Band Authentication system of claim 1, wherein the authentication system is configured to allow a credit card user to designate one or more locations as valid for on-line credit card transactions, and use the DAS authentication ranges as a physical location verification layer for an additional security layer for authorizing on-line transactions from only the one or more designated locations.

18. The GNSS In-Band Authentication system of claim 1, wherein the authentication system is configured to allow a user to designate one or more locations as valid personal locations, and use the DAS authentication ranges as a physical location verification layer as an additional security layer for an enhanced electronic signature verification to the one or more designated locations.

19. The GNSS In-Band Authentication system of claim 1, wherein the authentication system is configured to allow a user to designate one or more locations as valid WLAN access locations, and use the DAS authentication ranges as a physical location verification layer to restrict access to the WLAN to the one or more designated locations.

20. The GNSS In-Band Authentication system of claim 1, wherein the authentication system is configured to allow a user to designate one or more locations as valid WAN/WiMax access locations, and use the DAS authentication ranges as a physical location verification layer to restrict access to the WAN/WiMax to the one or more designated locations.

21. The GNSS In-Band Authentication system of claim 1, wherein the authentication system is configured to allow a user to designate one or more locations as valid to receive satellite broadcasting, and use the DAS authentication ranges as a physical location verification layer to restrict receiving satellite broadcasting to the one or more designated locations.

22. The GNSS In-Band Authentication system of claim 1, wherein the surveillance system is configured to transmit the received position report from the GNSS receiver to a third party authenticator and the third party authenticator computes verification ranges to the one or more DAS satellites from the reported position of the GNSS receiver, and compare the computed verification ranges to the reported authentication ranges and transmit a verification to the surveillance system when the computed verification ranges and the verification ranges in the received position report are within a predetermined tolerance.

23. The GNSS In-Band Authentication system of claim 1, wherein the authentication system is configured to store at least the reported GNSS position, the position time and authentication range in an archive and detect alterations to the position records by comparing the altered position derived range to the DAS satellite to the stored authentication range at the position time.

24. A method of providing GNSS In-Band Authentication, the method comprising:
    transmitting ephemeris data in a C/A message on the L1 band from GNSS satellites in a GNSS satellite constellation, wherein one or more GNSS satellites are designated authentication support (DAS) satellites and transmit a special status signal and intentionally corrupted ephemeris data and an intentionally corrupted C/A signal including a pseudo-random error on the L1 band;
    receiving ephemeris data on the at least one GNSS receiver in a GNSS user segment, wherein the at least one GNSS receiver:
        calculates its own position using GNSS satellites in the GNSS satellite constellation other than the one or more DAS satellites,
        determines authentication ranges to the one or more DAS satellites within a field of view of a GNSS receiver and position time, and
        transmits a position report comprising at least its calculated own position, position time, and the determined authentication range and DAS satellite identification information for the one or more DAS satellites within a field of view of the GNSS receiver to a surveillance system;
    wherein the surveillance system:
        receives the position report transmitted by the at least one GNSS receiver,
        computes verification ranges to the one or more DAS satellites using the reported position of the at least one GNSS receiver, uncorrupted ephemeris data for each of the one or more DAS satellites, and position time,
        compares the computed verification ranges to the determined authentication ranges in the received position report, and
        verifies the reported position of the at least one GNSS receiver when the computed verification ranges and the determined authentication ranges in the received position report are within a predetermined tolerance range.

25. The GNSS In-Band Authentication method of claim 24, wherein the surveillance system accesses the uncorrupted ephemeris data and uncorrupted C/A code without the pseudo-random error for the one or more DAS satellites to compute verification ranges.

26. The GNSS In-Band Authentication method of claim 24, wherein the position report includes authentication ranges to two DAS satellites.

27. The GNSS In-Band Authentication system of claim 24, wherein the surveillance system receives the position report, transmits the position report to a third party authenticator, and requests the third party authenticator to verify the position report of the at least one GNSS receiver.

28. The GNSS In-Band Authentication system of claim 27, wherein the third party authenticator accesses actual ephemeris and APN information for the one or more DAS satellites to compute verification ranges.

29. The GNSS In-Band Authentication method of claim 24, wherein the DAS authentication ranges to the one or more DAS satellites are used as a secure position selective communication (PSC) layer.

30. The GNSS In-Band Authentication method of claim 29, further comprising providing a secure communications channel that is only available at predetermined locations, each user attempting to link to the secure communications channel reports their position, and the reported position is compared to the predetermined locations by the PSC layer before the user is granted access to the secure communications channel.

31. The GNSS In-Band Authentication method of claim 24, wherein the PSC layer is used with other cryptographic layers to secure communications channels.

32. The GNSS In-Band Authentication method of claim 24, further comprising, for information push applications, using the authentication range to one DAS satellite as a public key to decrypt data encrypted by a private key generated using a secret range to the DAS satellite known to the surveillance system.

33. The GNSS In-Band Authentication method of claim 32, wherein data is encrypted using one DAS satellite position and a known position of a designated receiving unit and transmitted to the designated receiving unit, and only the designated receiving unit at the known position can decrypt the received data.

34. The GNSS In-Band Authentication method of claim 24, wherein a credit card user designates one or more locations as valid for on-line credit card transactions, and the DAS authentication ranges are used as a physical location verification layer for an additional security layer for authorizing on-line transactions from only the one or more locations.

35. The GNSS In-Band Authentication method of claim 24, wherein a user designates one or more locations as valid personal locations, and the DAS authentication ranges are used as a physical location verification layer as an additional security layer for an enhanced electronic signature verification to the one or more locations.

36. The GNSS In-Band Authentication method of claim 24 wherein a user designates one or more locations as valid WLAN access locations, and the DAS authentication ranges are used as a physical location verification layer to restrict access to the WLAN to the one or more locations.

37. The GNSS In-Band Authentication method of claim 24, wherein a user designates one or more locations as valid WAN/WiMax access locations, and the DAS authentication ranges are used as a physical location verification layer to restrict access to the WAN/WiMax to the one or more locations.

38. The GNSS In-Band Authentication method of claim 24, wherein a user designates one or more locations as valid to receive satellite broadcasting, and the DAS authentication ranges are used as a physical location verification layer to restrict receiving satellite broadcasting to the one or more locations.

39. The GNSS In-Band Authentication method of claim 24, wherein the surveillance system transmits the received position report from the GNSS receiver to a third party authenticator and the third party authenticator computes verification ranges to the one or more DAS satellites from the reported position of the GNSS receiver, and compares the computed verification ranges to the reported authentication ranges and transmits a verification to the surveillance system when the computed verification ranges and the verification ranges in the received position report are within a predetermined tolerance.

40. The GNSS In-Band Authentication method of claim 24, wherein at least the reported GNSS position, the position time and authentication range are stored in an archive and alterations to the position records are detected by comparing the altered position derived range to the DAS satellite to the stored authentication range at the position time.

* * * * *